| Patented June 16, 1953 | 2,642,439 |

UNITED STATES PATENT OFFICE

2,642,439

PROCESS FOR PRODUCING 7-BROMO-5-CHLOROISATIN AND THE CORRESPONDING SODIUM SALT OF ISATIC ACID

Robert F. Coles, Easton, Pa., assignor to General Aniline & Film Corporation, New York, N. Y., a corporation of Delaware No Drawing. Application June 3, 1950,
Serial No. 166,076

7 Claims. (Cl. 260—325)

This invention relates to 7-bromo-5-chloroisatin and salts of the corresponding isatic acid and to methods for preparing the same.

7-bromo-5-chloroisatin is a valuable intermediate in the production of inter alia dyestuffs, pharmaceuticals, and color formers for color photography. Said compound and its salts and methods for producing the same constitute the objects of the present invention.

Several methods may be employed in carrying out the foregoing objects as described hereinafter.

One such method involves first the chlorination of isatin in aqueous medium to 1,5-dichloroisatin. This product is then decomposed in sodium bisulfite solution followed by addition of a large amount of concentrated sulfuric acid to the boiling or hot solution to precipitate the 5-chloroisatin resulting from said decomposition. The isolated 5-chloroisatin is then brominated in an inert aqueous or organic medium by addition of free bromine to yield 7-bromo-5-chloroisatin.

Another and preferred method is based on the fact that the chlorine atom attached to nitrogen in 1,5-dichloroisatin is extremely labile. I have thus discovered that it is possible to prepare 7-bromo-5-chloroisatin in better yields directly from the chlorinating mixture without isolating any intermediates by utilizing this labile chlorine atom for the oxidation of bromide ions to free bromine which is then available for bromination in situ.

This method involves treating 1,5-dichloroisatin with a solution containing bromide ions which decompose the 1,5-dichloroisatin to yield 5-chloroisatin and free bromine in situ which which then react to give the desired 7-bromo-5-chloroisatin. Since any loss of the free bromine will reduce the yield of the desired product, it has been found advisable to add an excess of bromide ion to the original chlorinating mixture and, after the decomposition and bromination of the intermediate has proceeded for some time to pass into the reaction mixture a small stream of chlorine gas to furnish an additional supply of bromide to complete the bromination.

The salts of the isatic acid corresponding to 7-bromo-5-chloroisatin (2-amino-3-bromo-5-chloro phenylglyoxalic acid) may be produced in known manner by treatment of 7-bromo-5-chloroisatin with a suitable reactive basic compound of a metal, alkali metal or alkaline earth metal, whereby the desired salt is produced in soluble or insoluble form.

The invention is further illustrated by the following examples, although it is to be understood that they are illustrative and not limitative. Parts are by weight unless otherwise specified.

Example 1

A stirred suspension of 5-chloroisatin, 155 g. (0.85 mol) in 95% ethanol (1800 ml.) was heated to 76–77° C. and treated dropwise (fairly rapidly) with liquid bromine, 390 g. (2.45 mols) at this temperature. The solid dissolved and, shortly thereafter, an orange solid separated. The mixture was heated for one hour at 77–78° C. It was then cooled and the 7-bromo-5-chloroisatin filtered and washed with 95% ethanol, then thoroughly with water and dried.

Yield: 170 g (77% of theoretical yield), M. P. 246–247° C.

The reaction may be depicted as follows:

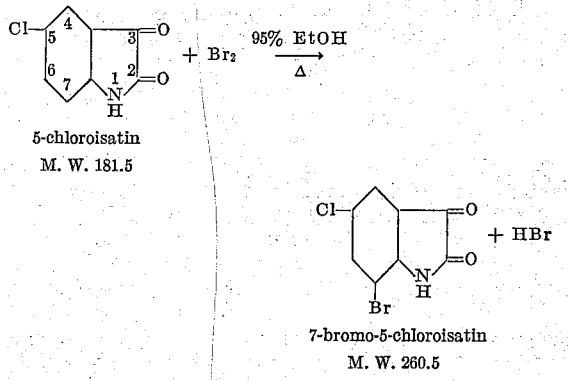

Example 2

To demonstrate the decomposition and bromination of 1,5-dichloroisatin which was prepared as described in D. R. P. 255,772, a sample of this material (21.6 g., 0.1 mol) suspended in 200 ml. of water was treated with potassium bromide (30 g., 0.25 mol) and 98% concentrated sulfuric acid (0.5 ml.) The stirred suspension was warmed gently on a steam bath at about 60° C. When the suspended material was converted to a light orange solid and Br₂ evolved, heating was discontinued to avoid loss of bromine and the mixture stirred for several hours. The solid (7-bromo-5-chloroisatin) was collected, washed with water and crystallized from glacial acetic acid to yield 13 g. (50% of theoretical yield) of bright orange solid, M. P. 245–246° C., which showed no depression in melting point when mixed with an authentic sample of 7-bromo-5-chloroisatin.

Example 3

Isatin (75 g.) suspended in water (1500 ml.) containing KI (5 g.) was treated at 15° C., while stirring, with an amount of chlorine slightly in excess of that theoretically required to form 1,5-dichloroisatin. The production of the 1,5-dichloroisatin intermediate was indicated when the melting point of a sample was about 150° C. At this point, the addition of chlorine was stopped and a solution of KBr (150 g.) in water (300 ml.) was added. The mixture was stirred for 6 hours and then a slow stream of chlorine gas was passed into the mixture until a sample when crystallized from acetic acid melted at 245–246° C., indicating production of 7-bromo-5-chloroisatin. The product was then collected, washed with water and crystallized from glacial acetic acid to yield 90 g. of product (67% of theoretical yield).

Example 4

The procedure of Example 3 was repeated except that instead of crystallizing from glacial acetic acid, the product was treated as follows:

The crude bromination product was collected, washed well with water and resuspended in hot water. The suspension was treated with 40% sodium hydroxide until the solid dissolved and was converted to the sodium salt of the isatic acid corresponding to 7-bromo-5-chloroisatin (pH 10–11). Brine (30%) was added to the hot solution until crystallization started. The solution was then cooled to room temperature and the solid collected (note 1). This solid was then redissolved in hot water, treated with charcoal, filtered and the hot filtrate treated with brine to incipent precipitation. The solution was cooled and the crystalline material collected (note 1). This crystalline material was reconverted to 7-bromo-5-chloroisatin by dissolving the sodium salt in hot water and acidifying slowly to pH 4–5 with concentrated hydrochloric acid.

Note 1.—A quantity of crude 5-chloroisatin which had not been brominated was obtained from the crystallization filtrate by acidification to pH 4–5 with concentrated hydrochloric acid. This material was satisfactory for bromination by the procedure in Example 1 to yield an additional quantity of the desired product.

The process as described hereinbefore may be modified and/or adjusted by a worker skilled in the art without departing from the scope of the invention. The following modifications are suggested by way of example only and are not to be regarded as restrictive.

It will, of course, be understood that in the process illustrated by Examples 2 and 3, instead of potassium bromide, any other sufficiently soluble ionizable bromide may be used which will liberate free bromine when reacted with 1,5-dichloroisatin. Thus there may also be employed ammonia, metal, alkali metal and alkaline earth metal bromides, for example, the bromides of sodium, potassium, ammonium, calcium, magnesium, and the like, hydrobromic acid, and the like. Likewise, any other ionizing media may be employed, as for example, aqueous alcohol or acetic acid, absolute alcohol, glacial acetic acid, or the like.

Accordingly, a convenient modification of Examples 2 and 3 consists in dissolving the moist filter cake of 1,5-dichloroisatin in absolute alcohol, adding two chemical equivalents of bromide ion, and finally adding an excess of free bromine as in Example 1.

In the process illustrated by Example 1, instead of a suspension of 5-chloroisatin in ethanol, there may be used any other inert aqueous or organic solvent medium, as for example, glacial acetic acid, trichlormethane, carbon tetrachloride and the like.

In the purification process of Example 4, sodium hydroxide is advantageously employed as the salt-forming base because of solubility and availability considerations and other factors. Other bases operative in said purification process lie in the class of materials which are of sufficient solubility and basic character, as for example the hydroxides and carbonates of potassium and lithium and the like, barium hydroxide and magnesium oxide. While ammonium hydroxide does not work very well, and the carbonates of barium, calcium and magnesium are not satisfactory due to insolubility, it will be readily understood that where minimum solubility properties are not required, any desired salt of the isatic acid corresponding to 7-bromo-5-chloroisatin with these and other bases may be readily produced regardless of their solubility and other characteristics without departing from the scope of the invention.

In general, while any temperature from room temperature to the boiling point of the medium may be used, the temperature in any particular instance may be adjusted and controlled to obtain the most efficient results. Thus, the use of heat in the process illustrated by Example 1 facilitates the bromination reaction, though heat is not absolutely necessary. In the process illustrated by Examples 2 and 3, since the bromine is liberated in situ in nascent condition, care must be taken to avoid too high a temperature as otherwise there would be an undue loss of bromine. In this situation, lower temperatures are advisable.

The product of this invention, 7-bromo-5-chloroisatin, is a particularly valuable intermediate in the production of 6-chloro-8-hydroxy quinoline derivatives by way of conversion by ring expansion to a quinoline followed by selective hydrolysis, as disclosed in applicant's copending application, Serial No. 156,720, filed April 18, 1950, now U. S. Pat. 2,579,420. If the reverse isomer were utilized, the conditions employed for the hydrolysis would convert the 6-Br group to a 6-OH, i. e., the final product would be a 6,8-dihydroxy quinoline derivative, which is of little value as a color former.

My invention has been described with respect to certain preferred embodiments thereof but various modifications and variations within the spirit and scope of the invention will become apparent to those skilled in the art. It is accordingly understood that such modifications and variations are to be considered as within the purview of this application and the scope of the appended claims.

I claim:

1. A process which comprises treating 1,5-dichloroisatin with a solution containing bromide ions to produce 7-bromo-5-chloroisatin.

2. A process which comprises treating 1,5-dichloroisatin with a solution containing bromide ions and then treating the resulting mixture with chlorine to produce 7-bromo-5-chloroisatin.

3. A process which comprises treating 1,5-dichloroisatin with a solution containing bromide ions and then treating the resulting mixture with bromine to produce 7-bromo-5-chloroisatin.

4. A process which comprises treating 1,5-dichloroisatin with a solution containing potassium bromide to produce 7-bromo-5-chloroisatin.

5. A process which comprises treating 1,5-dichloroisatin with a solution containing potassium bromide and then treating the resulting mixture with chlorine to produce 7-bromo-5-chloroisatin.

6. A process which comprises treating 1,5-dichloroisatin with a solution containing bromide ions to produce 7-bromo-5-chloroisatin and then treating the latter with sodium hydroxide to produce the sodium salt of the corresponding isatic acid.

7. A process which comprises treating 1,5-dichloroisatin with a solution containing sodium bromide, treating the resulting mixture with chlorine to produce 7-bromo-5-chloroisatin, and then treating the latter with sodium hydroxide to produce the sodium salt of the corresponding isatic acid.

ROBERT F. COLES.

References Cited in the file of this patent

FOREIGN PATENTS

| Number | Country | Date |
|---|---|---|
| 255,773 | Germany | Mar. 19, 1912 |

OTHER REFERENCES

Sumpter: Jr. Am. Chem. Soc., vol. 63 pp. 2027–2028 (1941).

Beilstein (1), vol. 21, "Handbuch der Organischen Chemie," page 450.

Beilstein (2), vol. 14, "Handbuch der Organischen Chemie," page 650.

Sumpter: Chemical Reviews, vol. 34 (June 1944), pp. 393–394.